US007315780B2

(12) United States Patent
Sugahara et al.

(10) Patent No.: US 7,315,780 B2
(45) Date of Patent: Jan. 1, 2008

(54) GUIDE SYSTEM, GUIDE APPARATUS, AND RADIO APPARATUS WHICH COMMUNICATES WITH GUIDE APPARATUS

(75) Inventors: Masato Sugahara, Yokohama (JP); Yoshinobu Uno, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 759 days.

(21) Appl. No.: 10/489,900

(22) PCT Filed: Sep. 12, 2002

(86) PCT No.: PCT/JP02/09346

§ 371 (c)(1), (2), (4) Date: Mar. 17, 2004

(87) PCT Pub. No.: WO03/027618

PCT Pub. Date: Apr. 3, 2003

(65) Prior Publication Data

US 2004/0254717 A1 Dec. 16, 2004

(30) Foreign Application Priority Data

Sep. 20, 2001 (JP) ............................ 2001-286826

(51) Int. Cl.
*G01C 21/34* (2006.01)

(52) U.S. Cl. .................. 701/200; 701/209; 455/456.1; 455/456.3; 340/995.12

(58) Field of Classification Search ................ 701/200, 701/209, 211; 705/417; 455/403, 414.1, 455/414.2, 414.3, 456.1, 456.2, 456.3; 340/995.1, 340/995.12, 995.19
See application file for complete search history.

(56) References Cited

U.S. PATENT DOCUMENTS

| | | | | |
|---|---|---|---|---|
| 5,559,707 | A | 9/1996 | DeLorme et al. | |
| 6,014,090 | A * | 1/2000 | Rosen et al. | 340/905 |
| 6,199,045 | B1 * | 3/2001 | Giniger et al. | 705/1 |
| 6,332,127 | B1 * | 12/2001 | Bandera et al. | 705/14 |

(Continued)

FOREIGN PATENT DOCUMENTS

EP 0 859 346 A1 8/1998

(Continued)

OTHER PUBLICATIONS

European Search Report for Application No. EP 02 79 9467, dated May 18, 2006.

(Continued)

*Primary Examiner*—Gary Chin
(74) *Attorney, Agent, or Firm*—RatnerPrestia

(57) ABSTRACT

A guide system for delivering data between a guide apparatus and a terminal without installing a data carrier reader. This guide system comprises a guide apparatus and a radio apparatus that is a terminal communicating with the guide apparatus. In the guide apparatus, guide data is generated on the basis of conditional data transmitted from the radio apparatus, the guide data is transmitted to the radio apparatus, and the conditional data is received from the radio apparatus. The radio apparatus comprises a communication unit which receives the guide data generated by the guide apparatus and transmits the conditional data to the guide apparatus. Thus, the radio apparatus receives and utilizes the guide data transmitted by the guide apparatus.

11 Claims, 15 Drawing Sheets

U.S. PATENT DOCUMENTS

| | | | | |
|---|---|---|---|---|
| 6,650,902 | B1 * | 11/2003 | Richton | 455/456.3 |
| 6,708,111 | B2 * | 3/2004 | Park | 701/209 |
| 6,778,901 | B2 * | 8/2004 | Nagamune et al. | 701/202 |
| 6,985,742 | B1 * | 1/2006 | Giniger et al. | 455/456.1 |
| 7,130,742 | B2 * | 10/2006 | Kobuya et al. | 701/207 |
| 7,149,625 | B2 * | 12/2006 | Mathews et al. | 701/209 |
| 2001/0005171 | A1 | 6/2001 | Farringdon et al. | |

FOREIGN PATENT DOCUMENTS

| | | | |
|---|---|---|---|
| JP | 05-016806 | A | 1/1993 |
| JP | 09-115095 | | 5/1997 |
| JP | 10-141972 | A | 5/1998 |
| JP | 10-160491 | A | 6/1998 |
| JP | 11-078889 | A | 3/1999 |
| JP | 11-232333 | A | 8/1999 |
| JP | 2000-151780 | A | 5/2000 |
| JP | 2000-315293 | A | 11/2000 |
| JP | 2001-074491 | A | 3/2001 |
| JP | 2001-134618 | A | 5/2001 |
| JP | 2001-148092 | A | 5/2001 |
| JP | 2001-184415 | A | 7/2001 |
| JP | 2001-241964 | A | 9/2001 |
| WO | WO 00/74019 | A1 | 12/2000 |

OTHER PUBLICATIONS

English translation of International Search Report for PCT/JP02/09346, dated Nov. 5, 2002.

* cited by examiner

GUIDE SYSTEM, GUIDE APPARATUS, AND RADIO APPARATUS WHICH COMMUNICATES WITH GUIDE APPARATUS

TECHNICAL FIELD

THIS APPLICATION IS A U.S. NATIONAL PHASE APPLICATION OF PCT INTERNATIONAL APPLICATION PCT/JP02/09346.

The present invention relates to a guide system which includes a guide apparatus for guiding a user on the basis of information such as maps or routes; and terminals for delivering data between itself and the guide apparatus.

BACKGROUND ART

Recently a guide system, which comprises a guide apparatus for guiding a user on the basis of information such as maps or routes, a data carrier reader for delivering data to the guide apparatus, and a data carrier for addressing the data into the data carrier reader, has been disclosed.

An instance of the foregoing guide systems is disclosed in Japanese Patent Application Non-Examined Publication No. H10-141972. This system displays positional information, which has been entered into a portable data carrier, on a display of a guide apparatus together with a map stored in the guide apparatus, thereby providing the user with instructions for a route to a destination.

The foregoing conventional structure has the following problems:

- the data stored in the data carrier contains only destinations and a pre-paid function of the transportation charges, so that the use of this system is limited;
- the data carrier reader must be installed at a place for the owner of the data carrier to conveniently use and connected to the guide apparatus with a wire, so that a place for installation and a cost are involved;
- the owner might happen to insert the data carrier into the reader in a wrong direction;
- the owner might happen to leave the data carrier in the reader and forget removing the carrier from the reader; and
- the owner might happen to put something other than the right data carrier in the reader.

DISCLOSURE OF THE INVENTION

The present invention aims to provide a guide system for delivering data between a guide apparatus and a terminal without installing a data carrier reader.

The guide system comprises a guide apparatus and a radio apparatus that is a terminal communicating with the guide apparatus. The guide apparatus includes a guide data generating means and a communication means. The guide data generating means generates guide data on the basis of the conditional data transmitted from the radio apparatus, and the communication means transmits the guide data to the radio apparatus and receives the conditional data from the radio apparatus.

The radio apparatus has a communication means for receiving the guide data generated by the guide apparatus and transmitting the conditional data to the guide apparatus. The radio apparatus thus receives and uses the guide data transmitted from the guide apparatus.

The structure discussed above does not need a data carrier reader and allows the radio apparatus to deliver a variety of conditional data to the guide apparatus through communication. The guide apparatus generates guide data in response to the variety of conditional data and delivers the guide data to the radio apparatus through communication. The radio apparatus then receives and uses the guide data.

BEST MODE FOR PRACTICING THE INVENTION

Exemplary embodiments of the present invention are demonstrated hereinafter with reference to the accompanying drawings.

Exemplary Embodiment 1

Figure 1:
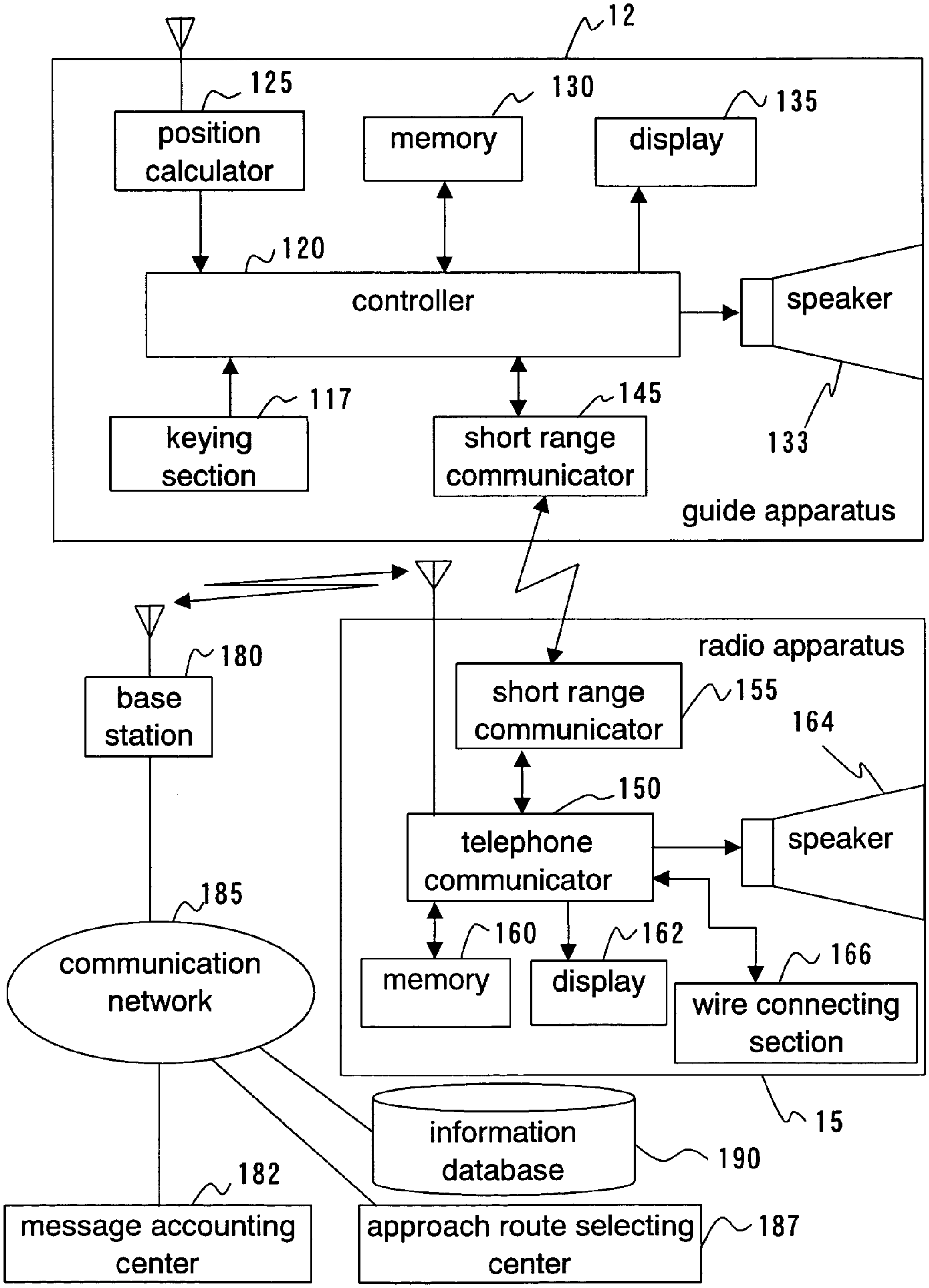
FIG. 1 shows a block diagram illustrating a specific structure of a guide system in accordance with a first exemplary embodiment of the present invention.
Figure 2:
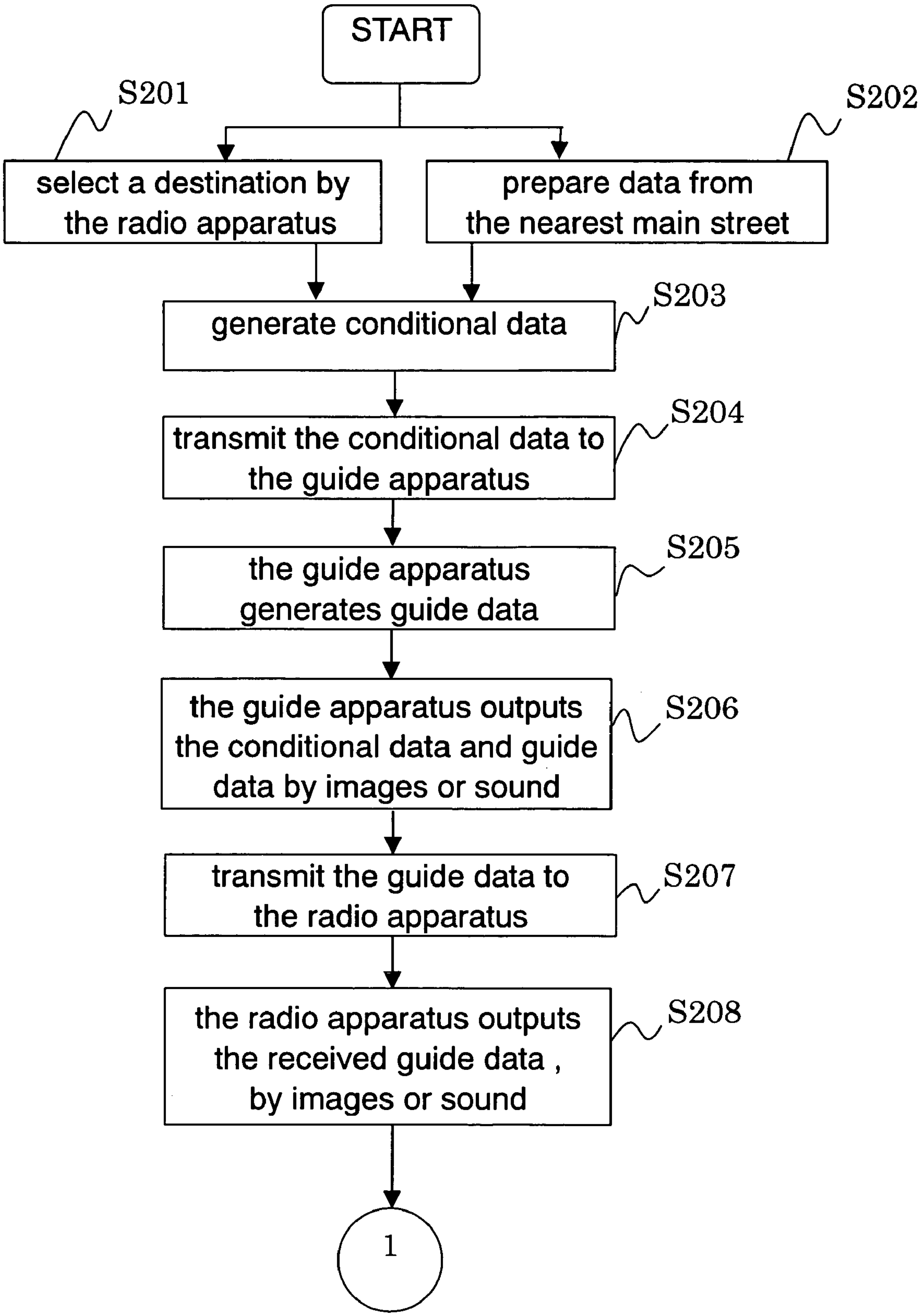
FIG. 2 shows a flowchart illustrating an operation of the guide system shown in FIG. 1.
Figure 3:
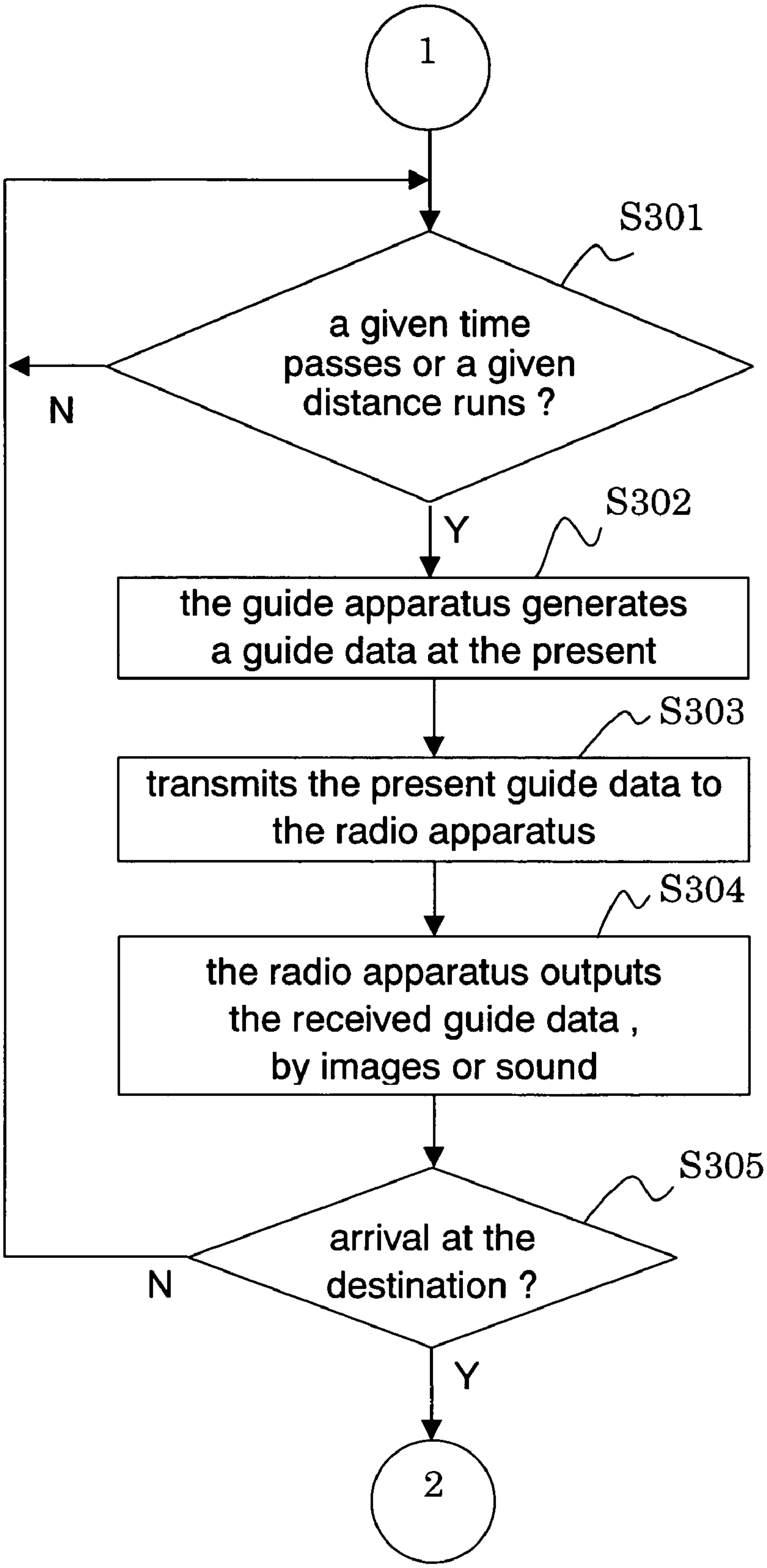
FIG. 3 shows a flowchart illustrating another operation of the guide system shown in FIG. 1.
Figure 4:
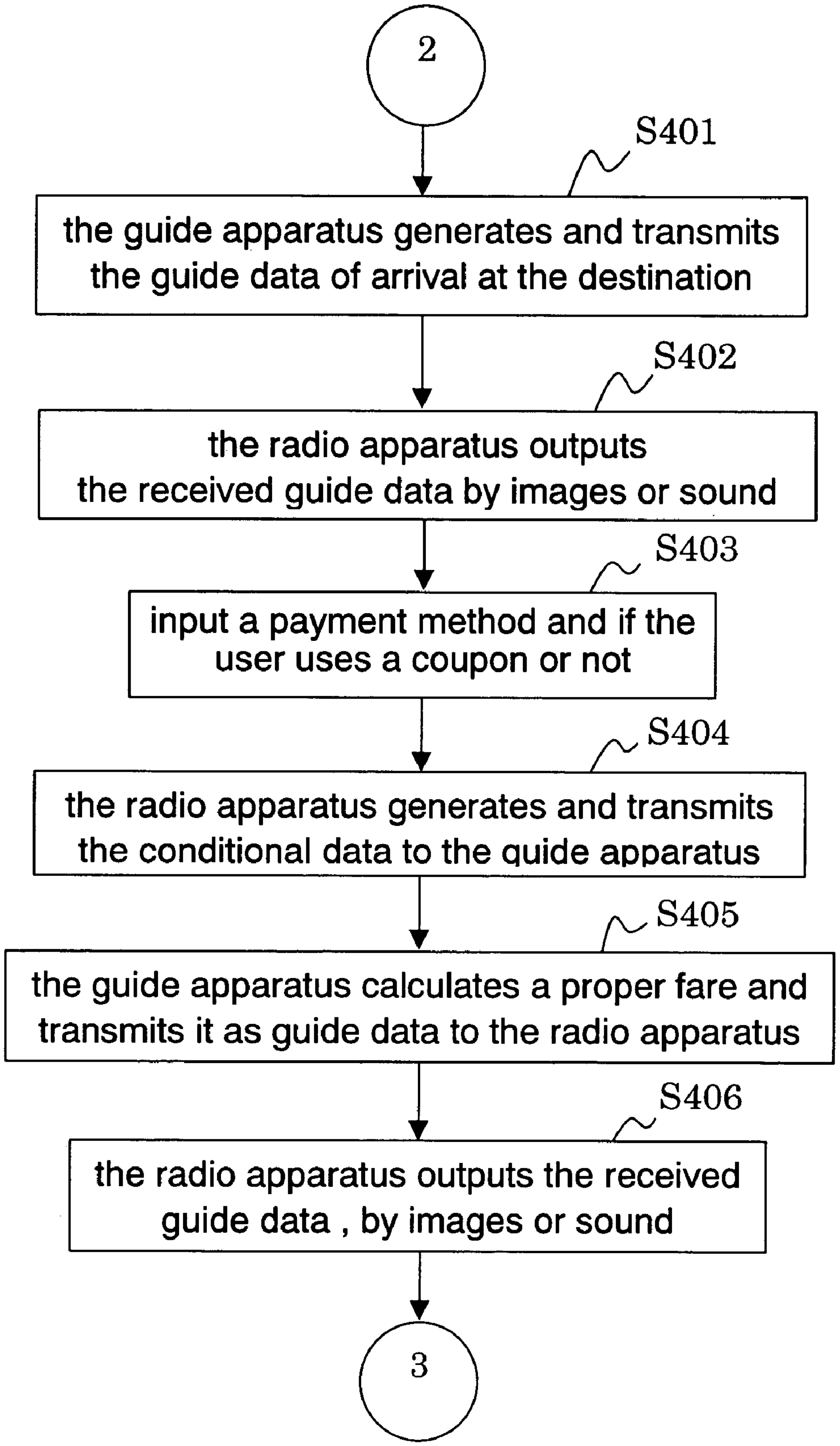
FIG. 4 shows a flowchart illustrating another operation of the guide system shown in FIG. 1.
Figure 5:
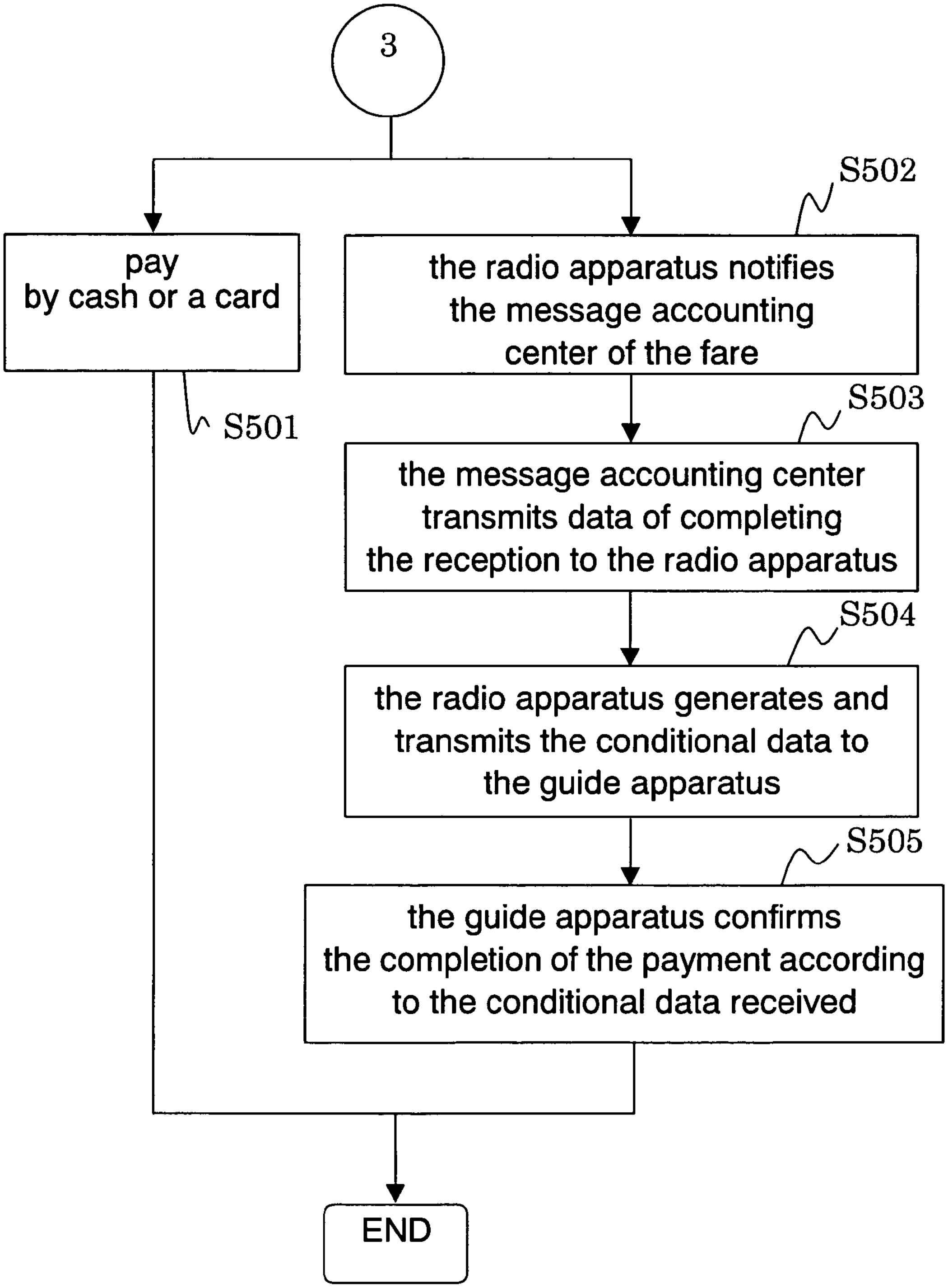
FIG. 5 shows a flowchart illustrating another operation of the guide system shown in FIG. 1.

FIG. 1 shows a block diagram illustrating a structure of a guide system in accordance with the first exemplary embodiment of the present invention. FIG. 2-FIG. 5 show flowcharts illustrating operations of the first embodiment.

The guide system shown in FIG. 1 comprises the following elements:

- guide apparatus 12 rigidly mounted to a vehicle such as a taxi and the like; and radio apparatus 15 such as a portable radiotelephone which can make a phone call through a public telephone line.

Guide apparatus 12 includes the following elements:

memory 130 for storing and retaining information;

short range communicator 145 for communicating between the apparatuses;

controller 120 for generating guide data;

position calculator 125 for calculating data of a present location;

keying section 117 for inputting data;

display 135 for displaying the guide data; and speaker 133 for transforming the guide data into audio or alarm sound before outputting.

Memory 130 stores and retains maps, guide information, and other information.

Short range communicator 145 communicates with radio apparatus 15 using Bluetooth signals, radio-wave in accordance with IEEE 802 standard, or optical communication including infrared rays. For instance, it carries out an apparatus-to-apparatus communication within a small area of 30 meters radius.

Controller 120 generates guide data using the information stored in memory 130 on the basis of the conditional data received at short range communicator 145 and transmitted from radio apparatus 15. Position calculator 125 calculates the data of present position using signals from Global Positioning System (GPS) satellites (not shown).

Display 135 transforms the conditional data received or the guide data generated into a map format, then displays them. Speaker 133 transforms the conditional data received or the guide data generated into audio or alarm sound, then outputs it.

Radio apparatus 15 comprises the following elements:

telephone communicator 150 such as a cellular phone;

short range communicator 155 for communicating between the apparatuses;

memory 160 for storing and retaining information and data;

speaker 164 for guiding with sound and voice;

display 162 for displaying guide data; and wire connecting section 166 for obtaining data from an external apparatus.

Telephone communicator 150 performs radiotelephone communication using radio base station 180 such as a cellular phone. Short range communicator 155 performs apparatus-to-apparatus communication between itself and guide apparatus 12 using Bluetooth signals, radio wave in accordance with IEEE 802 standard, or optical communication such as infrared communication. Telephone communicator 150 includes a controller (not shown) which controls structural elements of the radio apparatus, and generates, handles and processes data such as the conditional data.

Memory 160 stores and retains a variety of information and data obtained by telephone communicator 150. Speaker 164 supplies sound or voice in conversation or in a variety of guides. Display 162 transforms guide data received from guide apparatus 12 in response to display specifications for displaying. Wire connecting section 166 obtains necessary data by communicating with an external apparatus such as a personal computer.

Base station 180 is coupled to at least message accounting center 182, approach route selecting center 187, and information database 190 via communication network 185. Message accounting center 182 charges a message fee of radiotelephone. Approach route selecting center 187 generates an approaching place branched off from a main street as well as route information. Information database 190 is referred to through the Internet search.

An operation of the guide system having the forgoing structure is demonstrated hereinafter. There are plural methods of obtaining data necessary for radio apparatus 15 to generate conditional data:

(a) Obtaining the data in advance using guide apparatus 12 or a personal computer (not shown), which can communicate with radio apparatus 15, through radio-wave or optical communication via short range communicator 155 or wire connecting section 166.

(b) Telephone communicator 150 obtains the data from information data base 190 referred to through the Internet search or approach route selecting center 187 via base station 180 and communication network 185.

(c) The data is directly input through keys (not shown) of telephone communicator 150.

(d) the guide data transmitted from guide apparatus 12 and received at short range communicator 155

Telephone communicator 150 generates the conditional data on the basis of at least one of the data discussed above. For instance, a user takes a taxi and tells the destination to the driver. At this time, the user operates the key of telephone communicator 150 to select the destination from a list of places stored in advance in memory 160 of radio apparatus 15 (step 201, hereinafter a step is referred to simply as S).

Telephone communicator 150 uses a position data as conditional data corresponding to the destination selected through the key operation (S203). The conditional data is transmitted from short range communicator 155 to short range communicator 145 of guide apparatus mounted in the taxi (S204). The user can obtain the destination and its position data from information database 190 through the Internet search via communication network 185.

If the destination is located at the end of a residential area intricately away from a main street, radio apparatus 15 can transmit the information about an approaching place branched off from the nearest main street or the route information from the nearest main street as conditional data in addition to the position data of the destination (S202).

The foregoing additional information is input into radio apparatus 15 through one of the following methods (e)-(g):

(e) The additional information is produced by another apparatus on the basis of an electronic map available in the market or on the Web, then the information is input through wire connecting section 166.

(f) The additional information is input into radio apparatus 15 from another apparatus through short range communicator 155.

(g) The additional information is obtained from approach-route selecting center 187 through communication network 185, then the information is input into radio apparatus 15.

Guide apparatus 12 generates the following data as guide data with the aid of controller 120 on the basis of the conditional data received at short range communicator 145 and from the information stored in memory 130 (S205): expected arrival time; distance to the destination; and expected taxi fare to the destination. Display 135 displays the conditional data and the guide data (S206).

To be more specific, display 135 displays the conditional data, i.e. position information of the destination, and reads out the map data of the destination and its vicinity from memory 130. Then the position information and the map data are transformed to a destination mark or address information of the destination to be displayed primarily to the taxi driver.

Next, short range communicator 145 transmits the guide data produced in guide apparatus 12 to short range communicator 155 of radio apparatus 15 (S207). Radio apparatus 15 then transforms the guide data, i.e. expected arrival time, distance to the destination and expected taxi fare, received at short range communicator 155 together with the conditional data into a specification adequate to the display capacity of display 162 and displays them. Radio apparatus 15 also transforms the data into audio signals for outputting them through speaker 164 (S208).

During the ride to the destination, the following items are checked:

(h) whether or not a given time passes in guide apparatus 12; or (i) whether or not the taxi runs a given distance (S301).

(j) whether or not guide apparatus 12 receives conditional data including a taxi fare up to this moment, a remaining distance to the destination, and an updated expected arrival time, from radio apparatus 15.

When any one of (h)-(j) is satisfied, guide apparatus 12 generates the taxi fare up to this moment, the remaining distance to the destination, and the updated expected arrival time, as guide data (S302).

Short range communicator 145 transmits the guide data generated to radio apparatus 15 (S303), which then receives the guide data at short range communicator 155. Radio apparatus 15 transforms the data into a specification adequate to display 162 and speaker 164 for outputting (S304).

When the taxi arrives at the destination (S305), guide apparatus 12 transmits the following data as guide data from short range communicator 145 (S401): an arrival notice to the user, the name of the taxi company, the driver's name, the date and time of the ride, and the fare for cash payment. Radio apparatus 15 receives the guide data transmitted from guide apparatus 12 at short range communicator 155.

Radio apparatus 15 displays the arrival notice and the fare for cash payment on display 162 out of the guide data received, and informs the user of the arrival and the fare through speaker 164 (S402). Radio apparatus 15 also gives a notice of the arrival by vibrating a vibrator (not shown) integrated in telephone communicator 150.

Further, guide apparatus 12 transmits an advance notice of arrival as guide data, e.g. two minutes before or 500 meters before the destination. Radio apparatus 15 receives this guide data, i.e. the advance notice, and it can notify the user of this notice on the display, by the sound, or by the vibration. Radio apparatus 15 thus can notify a user falling asleep of the arrival by the sound or vibration.

Radio apparatus 15 checks the name of the taxi company out of the guide data received, and displays a past ride record (date, time and the number of rides) of the taxi in the same taxi company on display 162.

The user refers to the past record displayed, and inputs the following information through buttons of telephone communicator 150 (S403): a method of payment such as by cash, card, or charge to a radio-telephone account. The user also inputs whether or not to use a coupon for discount; the coupon is given to users depending on the number of rides for discounting the fare.

Radio apparatus 15 transmits conditional data including the method of payment, whether or not to use the coupon, and the past ride record in the same taxi company to guide apparatus 12 (S404). Radio apparatus 15 stores the name of taxi company, driver's name, date and time of the ride in memory 160 in case the user leaves behind an article in the taxi or makes a complaint about the taxi.

Guide apparatus 12 calculates a normal fare at controller 120 on the basis of the conditional data transmitted from radio apparatus 15, and transmits the calculation result as guide data to radio apparatus 15 (S405), which then receives the guide data, and the user confirms the guide data on display 162 (S406). The user pays the fare by cash or check to the driver according to the amount displayed. In the case of paying by card, the user hands in the card to the driver, who then handles the card in a card process device (not shown) to settle the payment (S501).

In the case of charging to a radio telephone account, telephone communicator 150 calls base station 180 and calls up message accounting center 182 via communication network 185 for handling the payment of the taxi fare (S502).

Message accounting center 182 receives the handling of paying the taxi fare, and transmits the data of reception completion to communicator 150 upon completing the handling (S503). Communicator 150 transmits the reception completion data as conditional data to guide apparatus from short range communicator 155 (S504). Guide apparatus 120 confirms the payment on the basis of the conditional data (S505).

In this embodiment as discussed above, without wiring between guide apparatus 12 and radio apparatus 15, radio apparatus 15 can transmit the following conditional data when necessary via a short range communication to guide apparatus 12 rigidly mounted in a taxi. The conditional data includes position data of destinations, an approaching place branched off from a nearest main street, a route branched off from a nearest main street, past ride records of the same taxi company, methods of payment, whether or not to use a coupon, and reception completion data.

On the other hand, guide apparatus 12 can transmit guide data corresponding to the conditional data received to radio apparatus 15 as appropriate. The conditional data includes an expected arrival time, an expected fare, remaining distance to a destination, fare at the moment, notice of arrival, name of the taxi company, driver's name, date and time of ride, fare for cash payment, and normal fare.

Guide apparatus 12 mounted in a taxi thus gives off advantages of identifying exactly a destination, an approaching route to the destination, and a past ride record of the taxi company. Radio apparatus 15 gives off advantages of informing a user via display 162, speaker 164 or a vibrator of the following data one after another: an expected arrival time, expected fare, remaining distance to the destination, fare at the moment, notice of arrival, name of the taxi company, driver's name, date and time of ride, fare for cash payment, and normal fare allowing discount for using a coupon.

In the instance discussed above, a taxi is taken for example as a vehicle; however, the present invention is not limited to taxis, but applicable to cars engaging in home-delivery service, limousines for transporting guests to hotels or private houses from an airport or a station, or circle buses within airport terminals.

In the case of a car engaging in home-delivery service, its conditional data may include receiver's name and address, a receiver's phone number, designated delivery time, sender's name and address, or sender's phone number. On the other hand, its guide data may include charges, and a reference phone number.

In the case of a limousine which transports guests to hotels or private houses from an airport or a station one by one, its conditional data may include a name or address of hotel, and its guide data may include, in addition to the guide data of taxi, a routine-stop route that gives the shortest mileage to the driver. The routine-stop route allows the driver to circulate the designated stops efficiently.

In the case of a circle bus for transporting passengers within airport terminals, its conditional data may include a name of flight company, flight number, and its guide data may include terminal numbers or gate numbers.

In this embodiment, the situation starting at the time when the user rides a taxi and onward is described; however the present invention is not limited to this situation. The present invention is applicable to a situation where a user wants to take a taxi. In this case, radio apparatus 15 transmits conditional data including position data of the destination, a desirable taxi company to the street from its short range communicator 155 intermittently in order to save the power consumption of radio apparatus 15.

A taxi cruising on the street receives the conditional data transmitted intermittently from radio apparatus 15 at its guide apparatus 12. If the taxi adapts to the condition, controller 120 generates an adaptation signal including the license plate number as guide data and transmits it to short range communicator 145.

Next, radio apparatus 15 receives the guide data, and recognizes an adaptive taxi according to the name of taxi company, the license plate number. This procedure effects an advantage similar to what is discussed previously.

In this embodiment, a portable radiotelephone, which communicates through general lines, is taken for example as the radio apparatus. However, the present invention is not limited to the portable radiotelephone, and applicable to other radio devices such as professional radio devices, simplified radio devices, personal radio devices, MCA (multi-channel access) radio devices, and digital MCA radio devices.

Exemplary Embodiment 2

The guide system in accordance with the second exemplary embodiment of the present invention includes guide apparatus 12 rigidly mounted in buses on a regular route. In the following discussion, the same descriptions as those in the first embodiment are omitted, and different points are focused for details.

Figure 6:
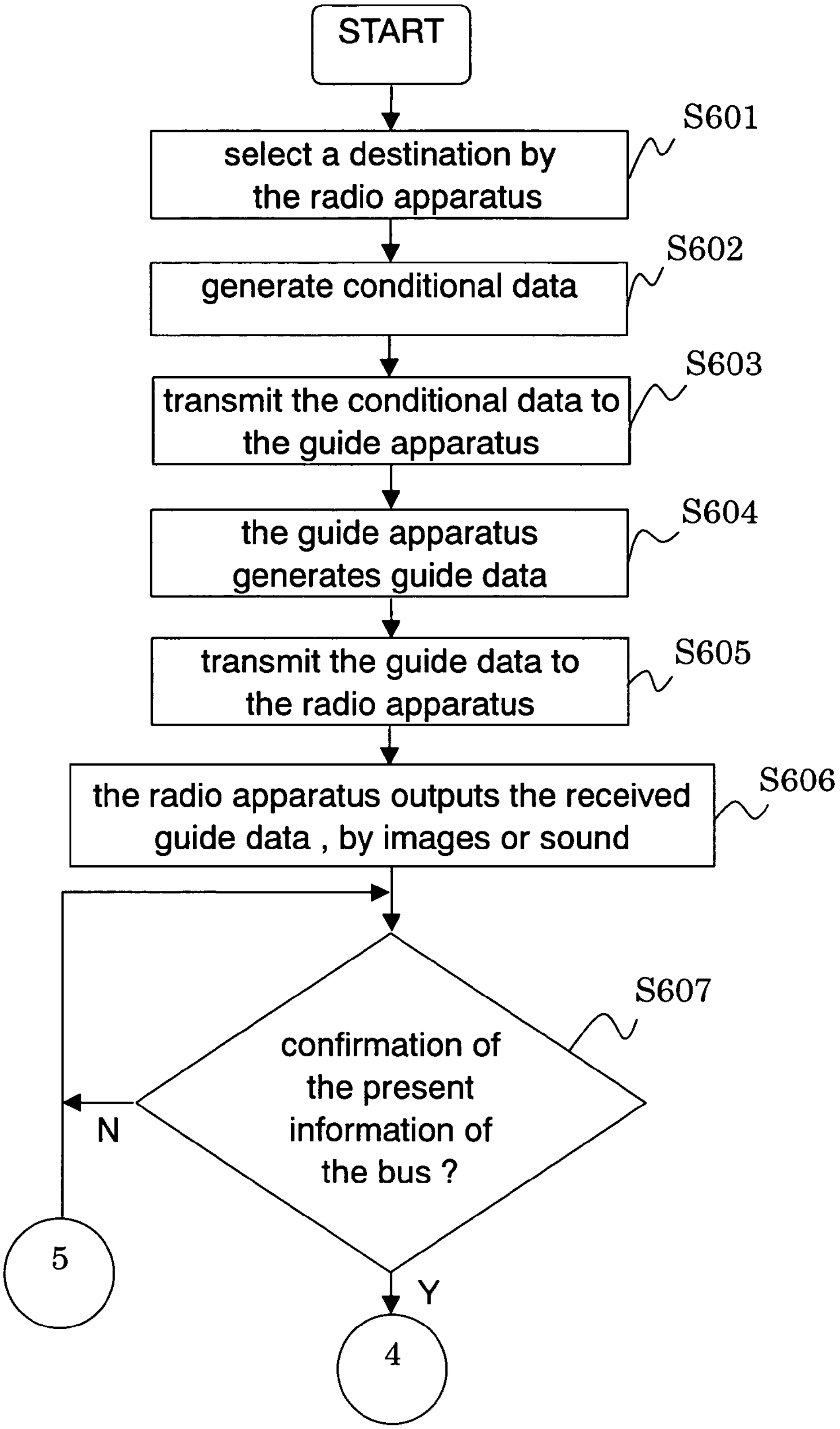
FIG. 6 shows a flowchart illustrating an operation of a guide system in accordance with a second exemplary embodiment of the present invention.
Figure 7:
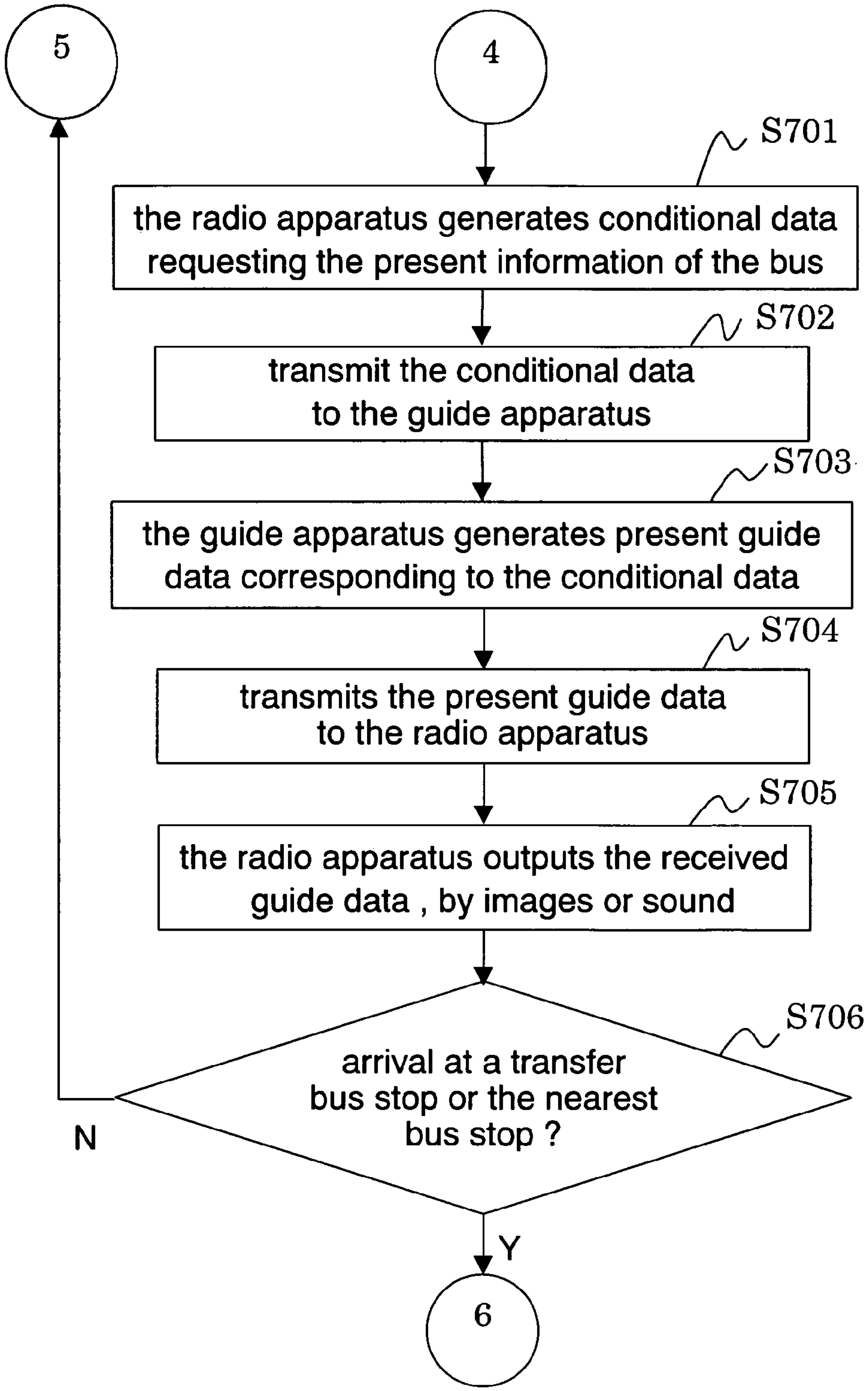
FIG. 7 shows a flowchart illustrating another operation of the guide system shown in accordance with the second embodiment.
Figure 8:
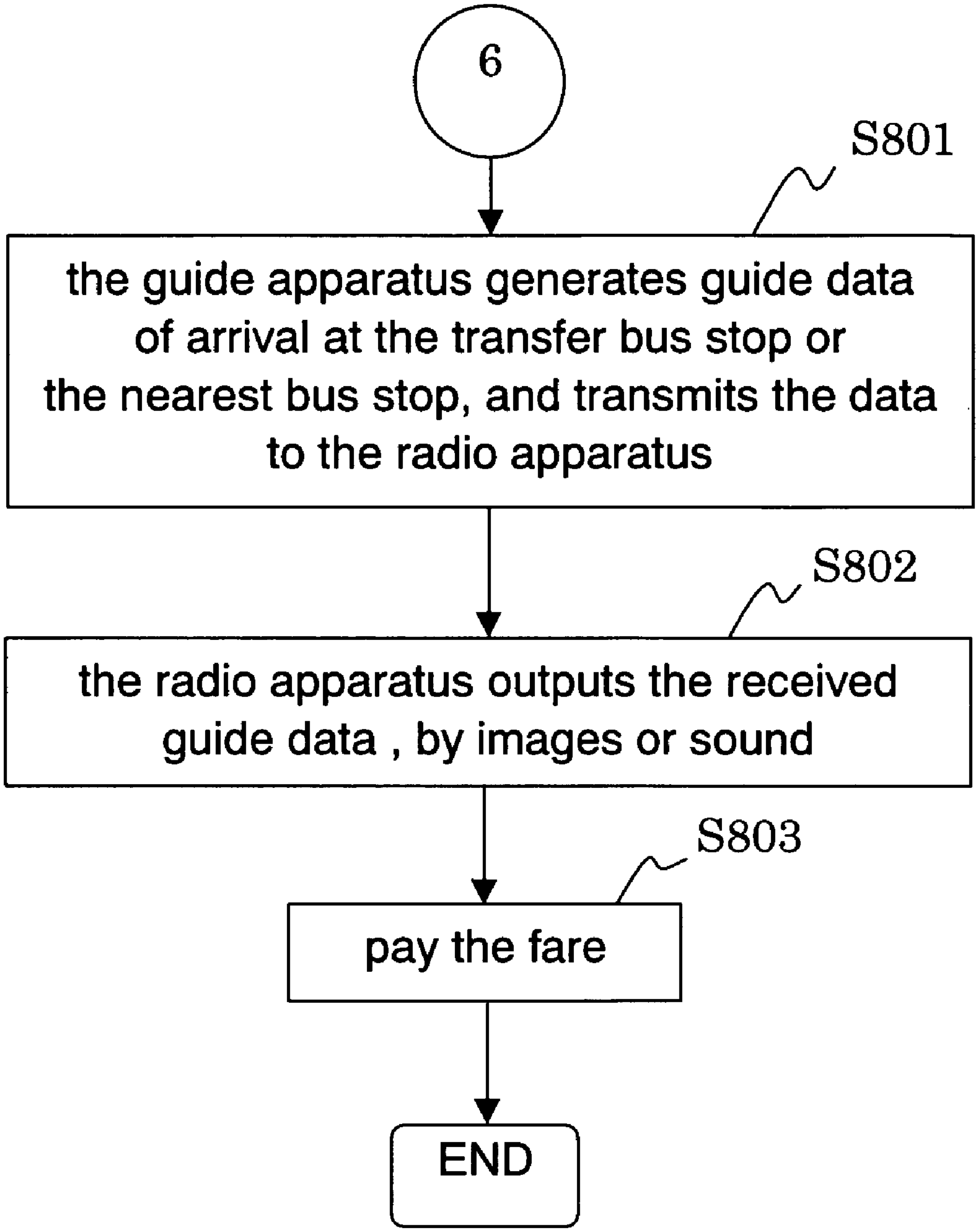
FIG. 8 shows a flowchart illustrating another operation of the guide system shown in accordance with the second embodiment.

FIG. 6 through FIG. 8 show flowcharts illustrating an operation of the guide system in accordance with this embodiment. When a user carrying radio apparatus 15 rides the bus and shows the destination by operating the keys of telephone communicator 150 for selecting the destination from the place-name list stored in memory 160 of radio apparatus 15 (S601).

Radio apparatus 15 transmits position data stored correspondingly to the destination selected as conditional data (S602) from short range communicator 155 to short range communicator 145 of guide apparatus 12 mounted in the bus (S603).

The destination and its position data can be obtained through the communication between telephone communicator 150 and base station 180. This communication uses the Internet search via communication network 185 for the foregoing data contained in the guide to buildings and addresses stored in information database 190.

Guide apparatus 12 generates guide data, on the basis of the conditional data received at short range communicator 145, using map information and route information both stored in memory 130 (S604). The guide data generated includes the nearest bus stop to the destination, and if necessary route information including a transfer bus-stop, a name of transfer-route and its route number, an expected arrival time, the number of bus-stops until the destination, and the fare.

Next, guide apparatus 12 transmits the guide data generated to short range communicator 155 of radio apparatus 15 from short range communicator 145 (S605). Radio apparatus 15 transforms the guide data received together with the conditional data into specification adequate to the display capability of display 162 before displaying those data, and also transforms them into audio signals for outputting them through speaker 164 (S606).

While the bus is running, guide apparatus 12 checks whether or not it receives any conditional data requiring the present bus information (S607). When radio apparatus 15 needs the present bus information, it generates conditional data for requiring the present bus information (S701) and transmits it to guide apparatus 12 (S702).

When guide apparatus 12 receives the conditional data, which requires the present bus information, from radio apparatus 15, guide apparatus 12 generates guide data including a next bus-stop, if necessary a transfer bus stop and a transfer route, the nearest bus stop to the destination, the instant expected arrival time, the instant number of bus stops until the destination, and the fare (S703).

Guide apparatus 12 transmits the guide data generated to radio apparatus 15 from short range communicator 145 (S704). Radio apparatus 15 receives the guide data at short range communicator 155, and transforms it to a data format adequate to the display capability of display 162. At the same time, radio apparatus 15 also transforms the guide data into audio signals for outputting the data through speaker 164 (S705).

When the bus arrives at the bus stop nearest to the destination or the transfer bus stop (S706), guide apparatus 12 transmits guide data, which includes an arrival notice to the user, the name of bus stop, if necessary a transfer route guide, and the fare, from short range communicator 145 (S801).

Radio apparatus 15 picks up the notice of arrival and the fare from the guide data transmitted from guide apparatus 12 and displays them on display 162. At the same time, radio apparatus 15 informs the user falling asleep of the arrival and the normal fare through speaker 164 (S802). It also gives the user the notice of arrival by vibrating the vibrator integrated in telephone communicator 150.

When the bus arrives at a bus stop just before the nearest bus-stop or the transfer bus-stop, guide apparatus 12 can transmit an advance arrival notice as guide data. Radio apparatus 15 can inform the user of this advance notice with display, sound or vibration.

The user confirms the guide data transmitted from guide apparatus 12 at display 162 of radio apparatus 15, then the user pays the fare by cash or a coupon ticket, or shows a pass before getting off the bus (S803).

As discussed above, the radio apparatus transmits the conditional data by the short range communication, the data including position data of the destination and a requirement of the instant bus information, to the guide apparatus rigidly mounted in a bus on a regular route.

On the other hand, the guide apparatus transmits the guide data as appropriate corresponding to the conditional data received to the radio apparatus. The guide data includes the bus stop nearest to the destination, if necessary a transfer bus-stop and a transfer route guide, an expected arrival time, the fare, the number of bus-stops until the destination, and an arrival notice.

As a result, the radio apparatus can inform the user of the following items one after another through the display, speaker or vibrator: a bus-stop nearest to the destination, if necessary a transfer bus-stop and a transfer route guide, an expected arrival time, a fare, the number of bus-stops until the destination, and an arrival notice.

Exemplary Embodiment 3

The guide system in accordance with the third exemplary embodiment of the present invention works in the following situation: Guide apparatus 12 is carried by a luggage-porter in a railway station or its vicinity or is rigidly mounted or detachably mounted to a luggage transporting cart. Guide apparatus 12 exchanges data with radio apparatus 15.

Figure 9:
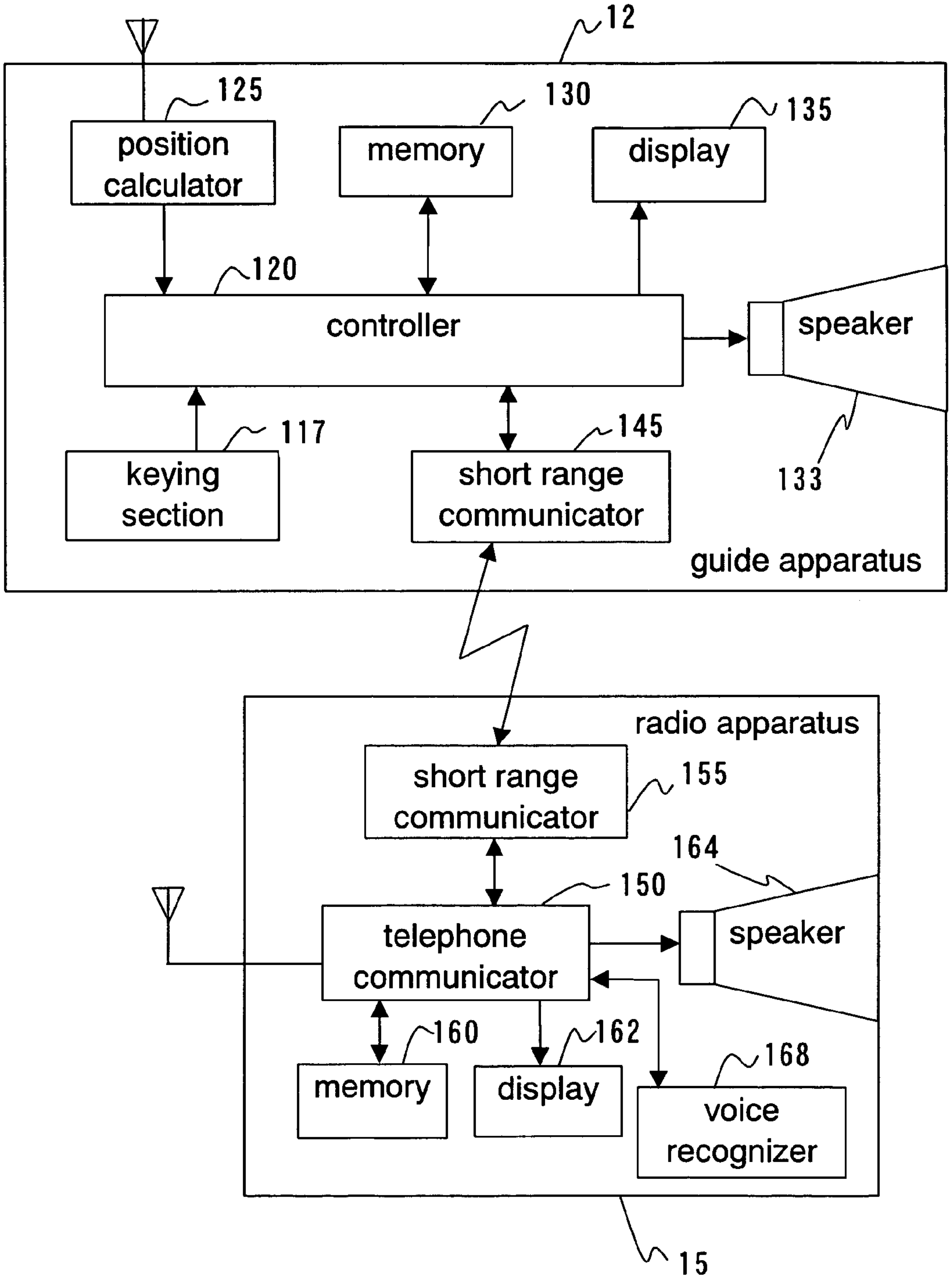
FIG. 9 shows a block diagram illustrating a specific structure of a guide system in accordance with a third exemplary embodiment of the present invention.
Figure 10:
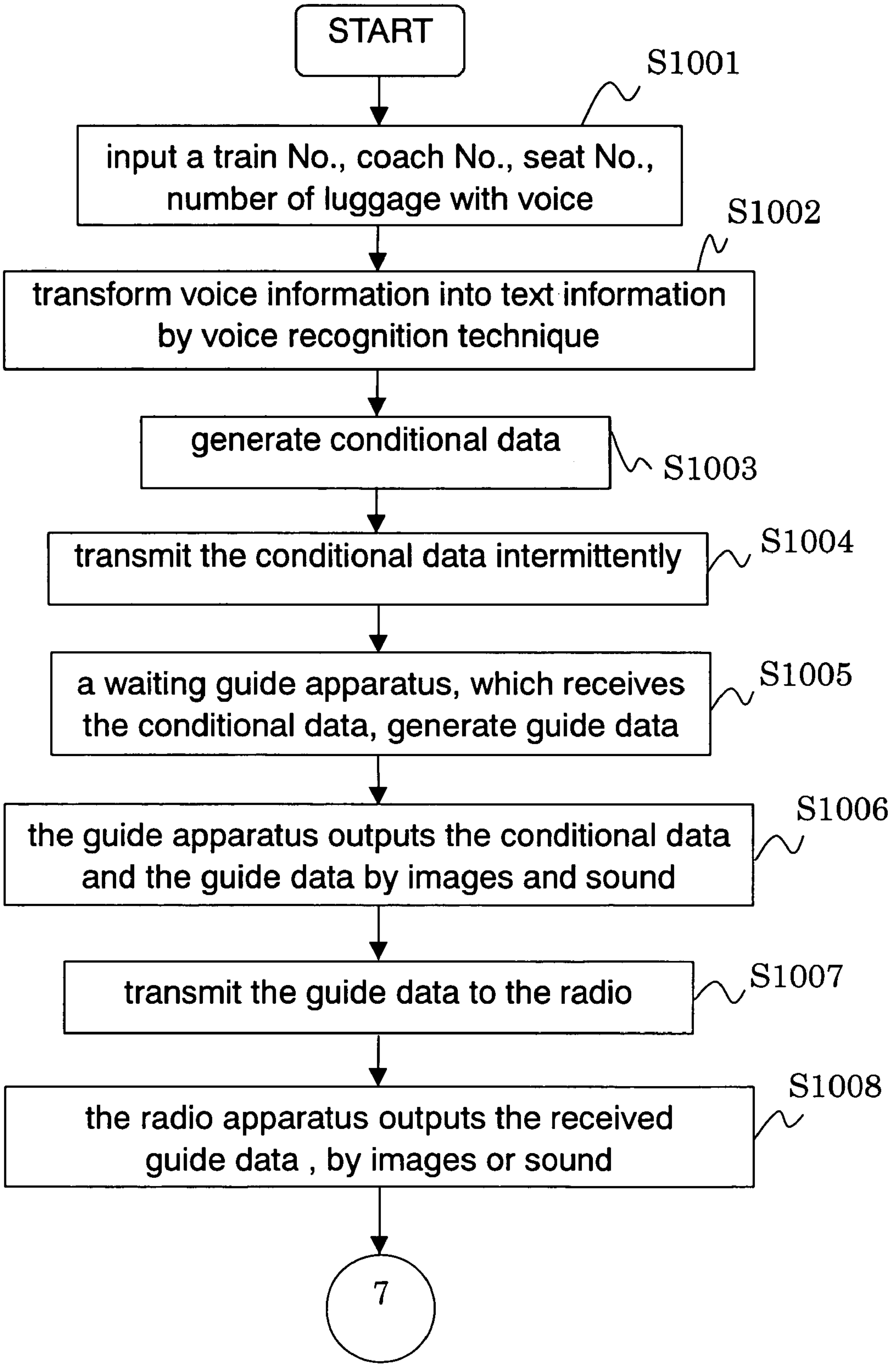
FIG. 10 shows a flowchart illustrating an operation of the guide system shown in accordance with the third embodiment.
Figure 11:
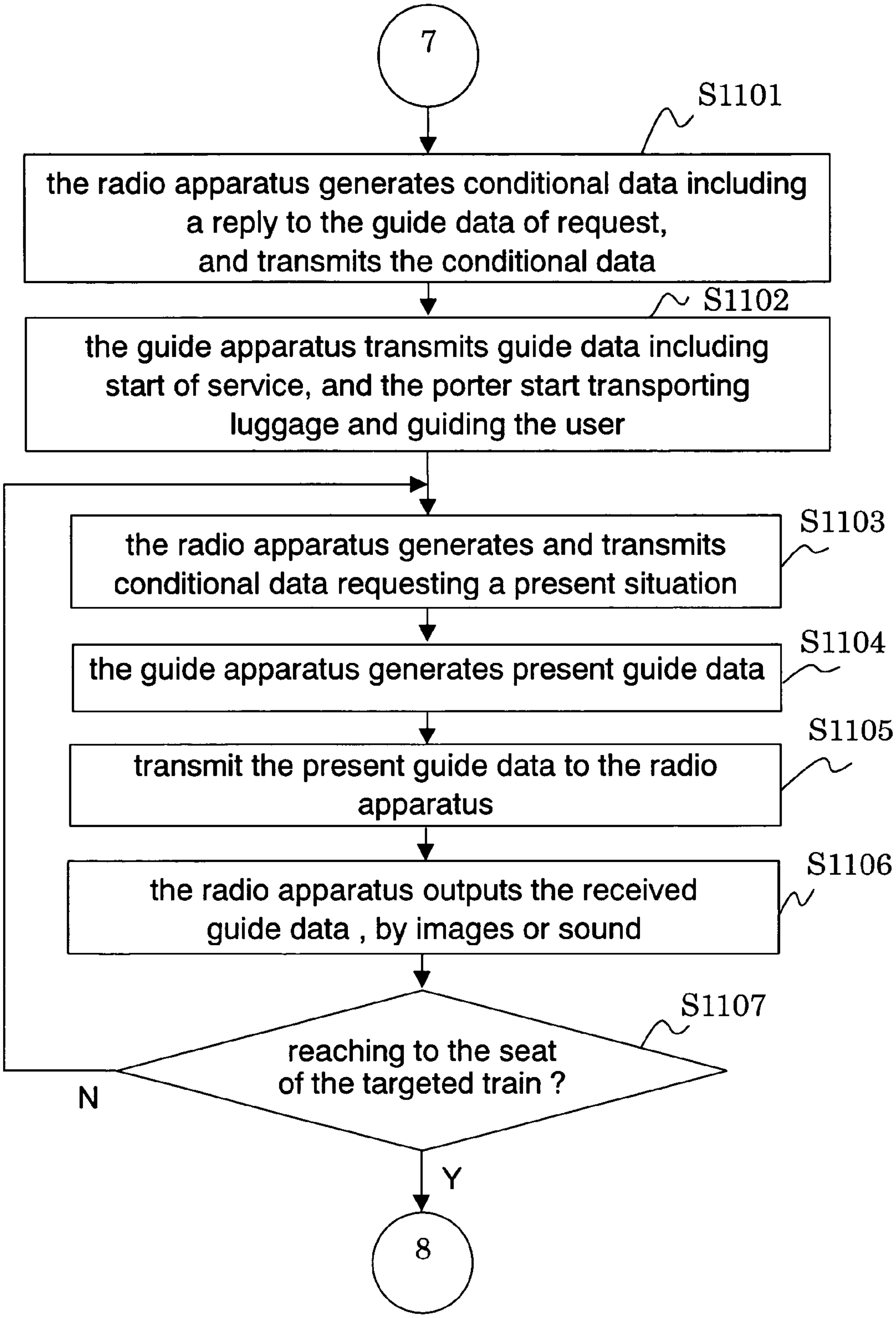
FIG. 11 shows a flowchart illustrating an operation of the guide system shown in accordance with the third embodiment.
Figure 12:
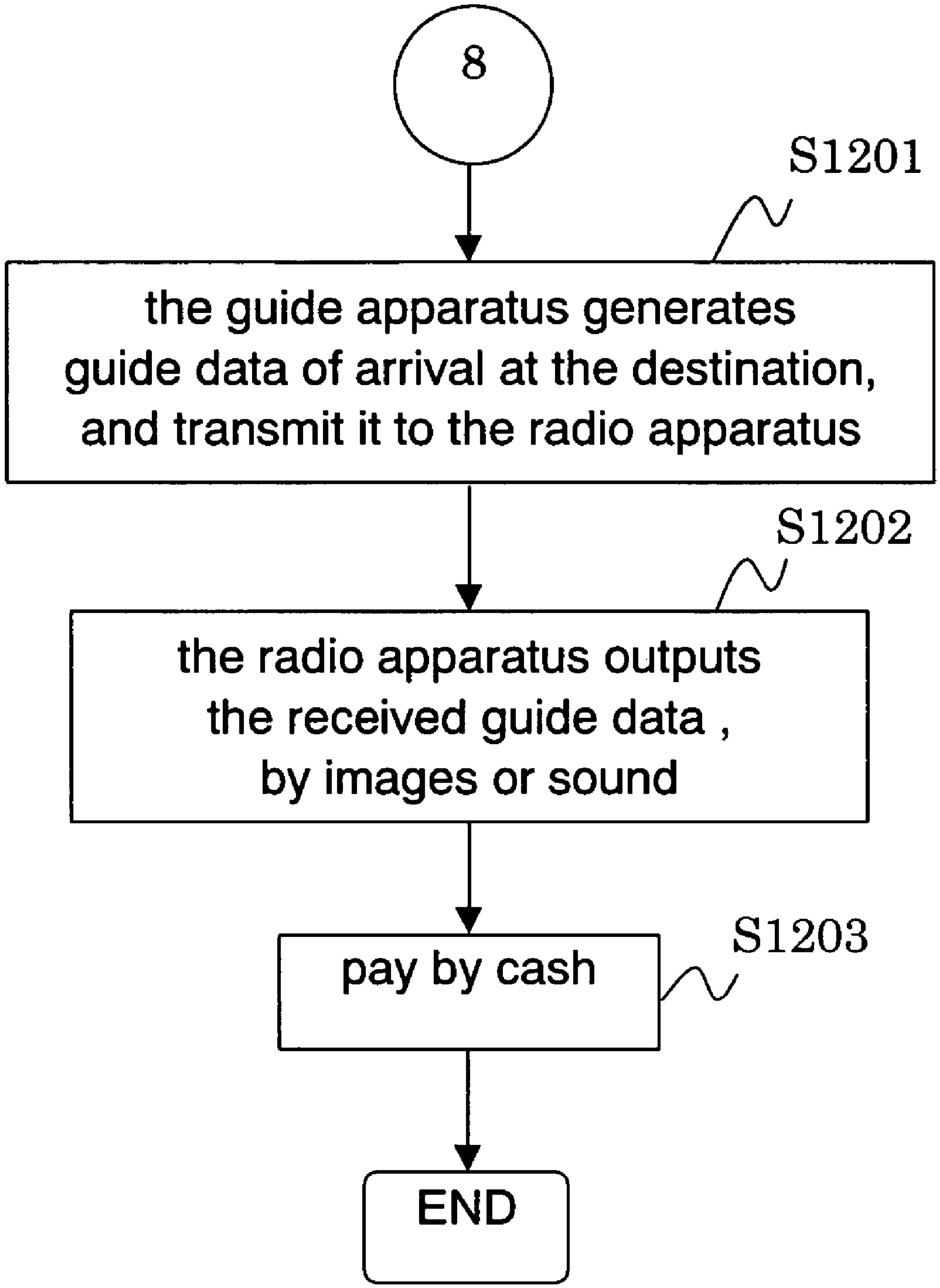
FIG. 12 shows a flowchart illustrating an operation of the guide system shown in accordance with the third embodiment.

In this third embodiment, the same processes as those in the first embodiment are omitted descriptions, and the different points are focused and detailed. FIG. 9 shows a schematic block diagram illustrating a guide system in accordance with the second embodiment. FIG. 10-FIG. 12 show a schematic flowchart illustrating an operation of the third embodiment.

In FIG. 9, radio apparatus 15 includes voice recognizer 168 that recognizes a voice supplied to a microphone (not shown) integrated in telephone communicator 150 and converts the voice into text data. Guide apparatus 12 is carried by a luggage-porter in a railway station or its vicinity or is rigidly mounted or detachably mounted to a luggage transporting cart.

An operation of this guide system is demonstrated hereinafter with reference to FIG. 9 through FIG. 12. A user already bought a ticket and decided to take a certain train, then the user inputs, in advance or at the site, a train No., a coach No., a seat No., and the number of luggage into the microphone (not shown) integrated in telephone communicator 150 of radio apparatus 15 (S1001). Voice recognizer 168 converts the voice signals into text data one after another, and sends the text data back to telephone communicator 150 (S1002).

Among guide apparatuses 12 which are available in a communicable range and have received the conditional data, waiting guide apparatus 12 generates guide data including the recognizable porter's ID, the train No., the platform No., expected move time, and a fee (S1005).

Guide apparatus 12 displays the guide data together with the conditional data on display 135, and transforms the data into voices before outputting them through speaker 133 (S1006).

Next, guide apparatus 12 transmits the guide data including the porter's ID, the train No., the platform No., the expected move time, and the fee to radio apparatus 15 (S1007). Radio apparatus 15 converts a format of the guide data adequately to the capacity of display 162 before displaying, and transforms the guide data into voice signals before outputting them through speaker 164 (S1008).

When radio apparatus 15 receives guide data from a plurality of guide apparatuses 12, it compares the guide data with each other for selecting a luggage porter who gives a desirable service, then generates and transmits conditional data including a hiring porter's ID and a request for the service (S1101).

When guide apparatus 12 receives the request for the service, it transmits guide data including a message of start-of-service, and the porter starts transporting the luggage and a guide if the user needs (S1102). The porter can simply guide the user without transporting the luggage.

If radio apparatus 15 needs the present situation, it generates conditional data of requesting the present situation (S1103). When guide apparatus 12 receives the conditional data of requesting the present situation, it generates guide data including an expected time until it arrives at the train the user is going to take (S1104), and transmits the data to radio apparatus 15 (S1105).

Radio apparatus 15 displays the guide data received on display 162 and outputs the data as voice signals through speaker 164 (S1106). When guide apparatus 15 arrives at the train (S1107), it generates and transmits guide data including an arrival notice, the company name of the porter, the porter's name, the date and time of the service, and the fee (S1201).

Radio apparatus 15 displays the guide data received on display 162, and outputs the data as voice signals through speaker 164 (S1202), and stores the data to be necessary in the future such as the company name of the porter, the date and time of service, and the fee in memory 160. The user, i.e. the owner of radio apparatus 15, pays the fee by cash (S1203).

The radio apparatus as discussed above transmits the conditional data, which includes the No. of a train to take, a coach No., a seat No., and the number of luggage, using the short range communicating function, to the guide apparatuses the luggage porters carry in the station or its vicinity.

On the other hand, a guide apparatus receives the conditional data and transmits guide data correspondingly thereto to the radio apparatus as appropriate. The guide data includes the porter's ID, the train No., the platform No., an expected move time, the fee, the company name of the porter, the data of time of the service, and an arrival notice.

The foregoing system allows finding a luggage porter with ease in a large station, guiding a platform number corresponding to a train, and guiding the blind to the train. The users can receive those services through the display or the speaker in addition to the service of transporting luggage.

In the foregoing instance, the luggage-porter at a station is taken for example; however, the present invention is not limited to the luggage-porter, but applicable to a luggage-porter in an airport, a bell-boy who transports luggage from a check-in-counter to a guest room at a hotel, or applicable to a luggage-transporting cart to which the apparatus is mounted.

A cash payment is taken for example in the embodiment; however, the payment can be by check, card, or charge to a radio-telephone account, as they are accepted in the first embodiment.

Exemplary Embodiment 4

The guide system in accordance with the fourth exemplary embodiment of the present invention prepares guide apparatus 12 exclusively and rigidly to a guide desk in a theme park. In this fourth embodiment, the descriptions of the same processes as those in the first embodiment are omitted, and the different points are focused and for details.

Figure 13:
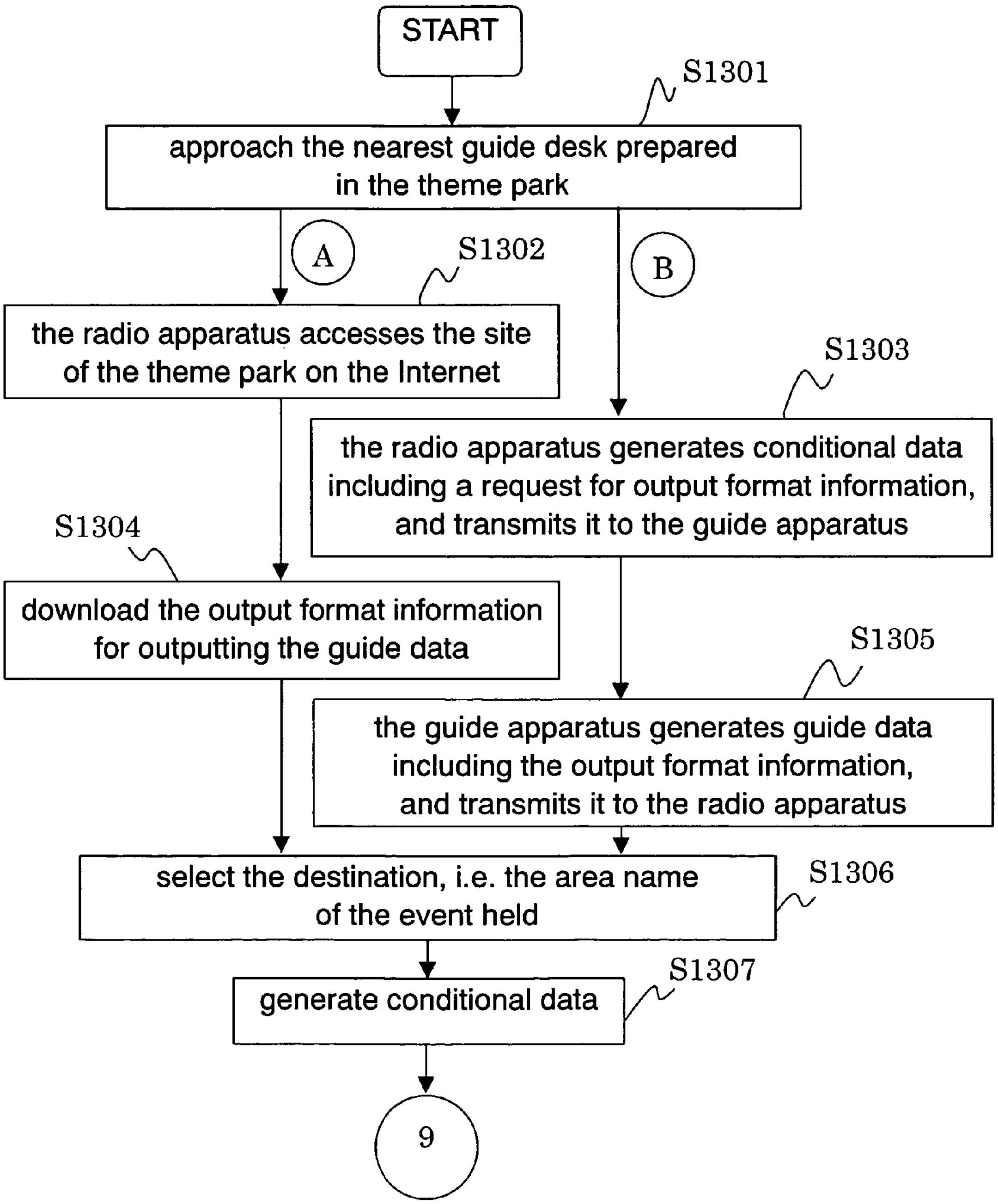
FIG. 13 shows a flowchart illustrating an operation of a guide system in accordance with a fourth exemplary embodiment of the present invention.
Figure 14:
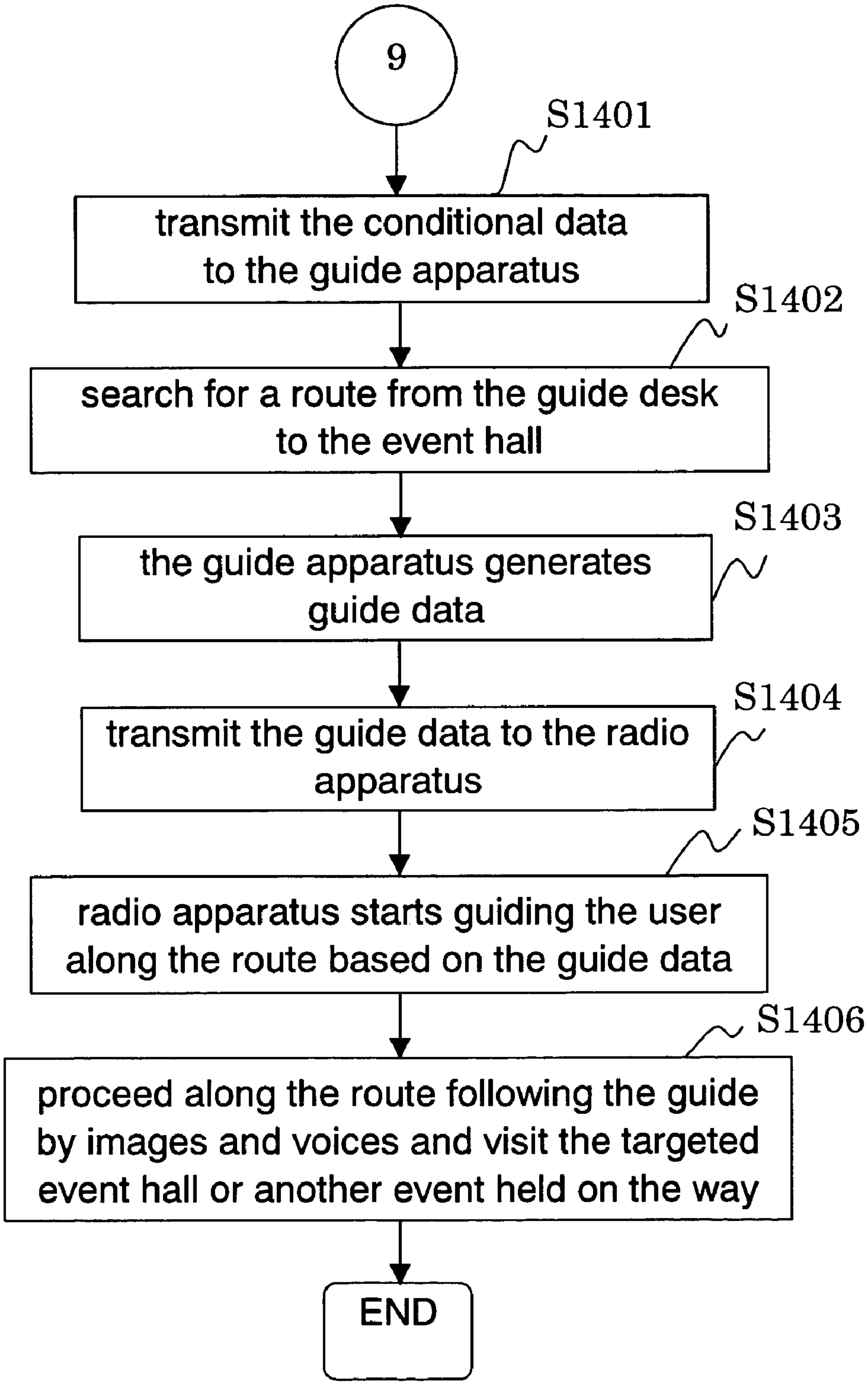
FIG. 14 shows a flowchart illustrating an operation of the guide system shown in accordance with the fourth embodiment.

FIG. 13 and FIG. 14 show a schematic flowchart illustrating an operation of the fourth embodiment. An operation of the guide system in accordance with the fourth embodiment is demonstrated hereinafter with reference to FIG. 13 and FIG. 14.

If a user wants to know a route to an event hall in the theme park, the user approaches the nearest guide desk prepared in the theme park (S1301).

In the case of "A" marked in FIG. 13, telephone communicator 150 of radio apparatus 15 is telephonically-connected to base station 180, then accesses the site sponsored by the theme park via the Internet using communication network 185 (S1302). Radio apparatus 15 downloads the information about an output format necessary for outputting guide data through display 162 and speaker 164 from the site sponsored by the theme park (S1304). The guide data needed includes programs how to recognize locations about the buildings and passages in the theme park, data format of the data including the name, longitude and latitude of the event hall.

In the case of "B" marked in FIG. 13, radio apparatus 15 generates conditional data requesting information about an output format necessary for outputting the guide data about the theme park through display 162 and speaker 164. Then it transmits the conditional data to guide apparatus 12 from its short range communicator 155 (S1303).

Guide apparatus 12 receives the conditional data transmitted from radio apparatus 15, and generates the information about the output format as guide data on the basis of the content of the conditional data, then transmits it to radio apparatus 15 from its short range communicator 145 (S1305).

Radio apparatus 15 obtains the information about the output format with the method described in either one of "A" or "B" marked in FIG. 13. Then radio apparatus 15 selects the destination, i.e. the event hall, from the output format information (S1306), and generates conditional data (S1307). Then it transmits the conditional data generated to guide apparatus 12 (S1401).

When guide apparatus 12 receives the conditional data at short range communicator 145, controller 120 searches for a route from the guide desk to the event area on the basis of the content of the conditional data and using the pre-stored position information of the guide desk, the conditional data received, and the information stored in memory 130 (S1402).

Guide apparatus 12 generates guide data including the route searched and information about other events held along the route (S1403), then transmits the guide data to radio apparatus 15 (S1404).

Radio apparatus 15 receives the guide data, and starts the route-guide according to the output format information obtained previously (S1405). Radio apparatus 15 outputs the route-guide through display 162 or speaker 164 one after another along the route. The user can visit the targeted event hall or drop in other events on the way (S1406).

In this embodiment as discussed above, the radio apparatus obtains the information about an output format, necessary for outputting conditional data on the display or via the speaker of the radio apparatus, through one of the following two methods. This is done prior to transmitting the conditional data including a name of an event hall to a guide apparatus prepared rigidly at a guide desk from the short range communicator of the radio apparatus. The two methods are as follows:

(k) Download the output format information from the site on the Internet sponsored by the theme park via communication net work 185; and (l) Request the guide data to supply the information as guide data.

The output format information is used when guide data is output on the display or through the speaker of the radio apparatus, and includes programs how to recognize a location in the theme park as well as data format of the data including names, longitudes and latitudes of locations.

The guide apparatus transmits the guide data corresponding to the conditional data received from the guide desk, where the guide data includes the route searched and information about other events along the route.

Therefore, even if the guide information of the theme park has an output format different from that of the radio apparatus, the radio apparatus can output the guide correctly. As a result, a universal guide system can be provided.

In the foregoing embodiment, the guide apparatus prepared at a guide desk is taken for example; however, the present invention is not limited to the case of a theme park. The guide apparatus, to which the present invention is applicable, can be prepared at guide desks in stations, bus terminals, airports, hotels, or department stores. The guide desks guide users to a platform in a station, a route-bus name, a location of a bus stop, a boarding gate in an airport.

Exemplary Embodiment 5

The guide system in accordance with the fifth exemplary embodiment of the present invention is a combination of the guide systems described in the first through fourth embodiments. The respective guide apparatuses are prepared to communicate to a center apparatus directly or via a communication network with wires or radio.

Figure 15:
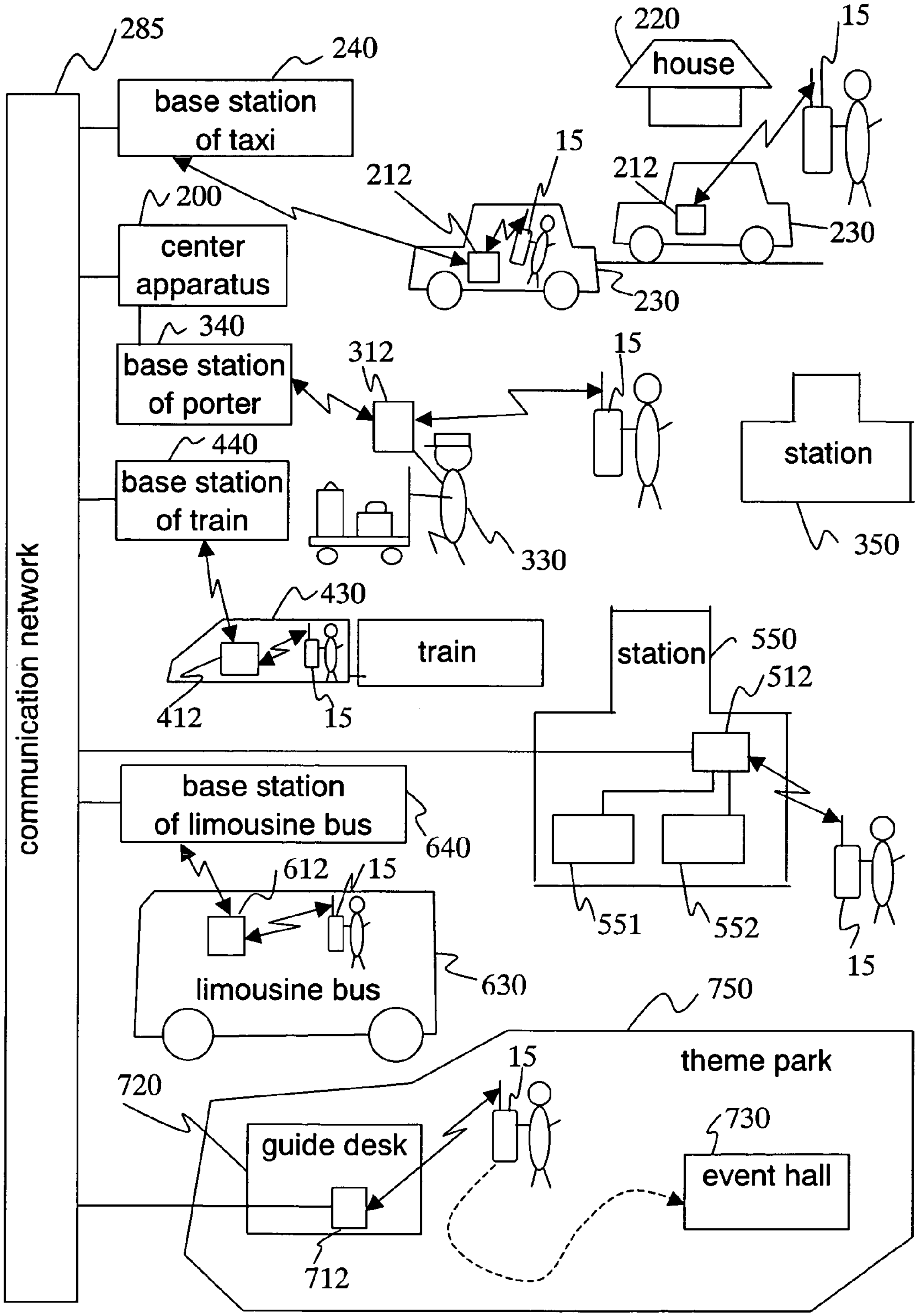
FIG. 15 shows a block diagram illustrating a specific structure of a guide system in accordance with a fifth exemplary embodiment of the present invention.

In this fifth embodiment, the same processes as those in the first embodiment are omitted descriptions, and the different points are focused for details. FIG. 15 shows a schematic block diagram illustrating the guide system in accordance with the fifth embodiment.

In FIG. 15, a user who uses radio apparatus 15 transmits intermittently conditional data prepared near user's house 220. Taxi 230 carrying guide apparatus 212, which communicates with radio apparatus 15 by a short range communication, includes a second communicating means (not shown), through which taxi 230 communicates with the base station of taxi 230 and center apparatus 200 via communication network 285.

Porter 330 is available in station 350 or its vicinity and carries guide apparatus 312 communicable with radio apparatus 15 by a short range communication. Guide apparatus 312 includes a second communication means (not shown), through which porter 330 can communicate with the base station of the porter and center apparatus 200 connected to base station 340 with wires directly.

Guide apparatus 412 is mounted in train 430 communicable with radio apparatus 15 by short range communication, and includes a second communication means (not shown), through which guide apparatus 412 can communicate with center apparatus 200 via base station 440 of the train and communication network 285.

Guide apparatus 512 is prepared at a guide desk (not shown) in station 550 and communicable with radio apparatus 15 by a short range communication. Guide apparatus 512 also includes a second communication means (not shown), through which it can communicate with center apparatus 200 via communication network 285. Guide apparatus 512 further obtains data about a magnitude of crush at the wickets detected by detectors 551, 552, i.e. means for obtaining vicinity information.

Guide apparatus 612 is mounted in limousine bus 630 and communicable with radio apparatus 15 by a short range communication. Guide apparatus 612 also includes a second communication means (not shown), through which guide apparatus 612 can communicate with center apparatus 200 via base station 640 of the limousine bus and communication network 285.

Guide apparatus 712 is prepared at guide desk 720 in theme park 750 and communicable with radio apparatus 15 by a short range communication. Guide apparatus 712 also includes a second communication means (not shown), through which guide apparatus 712 can communicate with center apparatus 200 via communication network 285. The user of radio apparatus 15 wants to visit event hall 730.

Next, an operation of the guide system in accordance with this embodiment is demonstrated with reference to FIG. 15.

The user of radio apparatus 15 operates apparatus 15 to select a first destination, i.e. station 350, and a desirable taxi company, then generates conditional data including the foregoing data and transmits the conditional data intermittently.

Guide apparatus 212 mounted in taxi 230 receives the conditional data and analyzes the content thereof. If the condition fits taxi 230, guide apparatus transmits an adaptable signal including a license plate number of the taxi as guide data. Radio apparatus 15 recognizes taxi 230 adaptable on the basis of the guide data received, and taxi 230 stops to pick up the user of radio apparatus 15.

Riding taxi 230, the user selects adequate data from a variety of data stored in radio apparatus 15, and generates conditional data, then transmits the data to guide apparatus 212. Assume that the following data are selected for generating the conditional data:

(m) a first destination, i.e. station 350;

(n) a request for a porter;

(o) the number of luggage (p) a train number of train 430 of which ticket the user bought, a coach number, a seat number, and station 550 where the user gets off;

(q) a name of destination, i.e. theme park 750;

(r) the number of people the user accompanies;

(s) a payment method, i.e. charge to a radio-telephone account; and (t) a telephone number of radio apparatus 15.

Guide apparatus 212 generates guide data on the basis of the conditional data received, and transmits the following guide data to radio apparatus 15:

(u) an expected arrival time at the first destination;

(v) a distance to station 350; and (w) an expected fare.

If guide apparatus 212 has no information about the conditional data for generating guide data by itself, guide apparatus 212 transmits the conditional data to center apparatus 200 via base station 240 of the taxi and communication network 285. Center apparatus 200 analyzes the conditional data received and deals with sequentially.

First, center apparatus 200 transmits the following data to guide apparatus 312 carried by porter 330:

(x) expected arrival time at station 350;

(y) the number of luggage;

(z) the train number of train 430 the user rides, the coach number, and the seat number; and (aa) the telephone number of radio apparatus 15.

Guide apparatus 312, if it can accept a reservation, generates guide data including a porter's ID and a fee, then transmits the guide data to center apparatus 200 via base station 340 of the porter. Center apparatus 200 transmits the guide data received to guide apparatus 212 via communication network 285 and base station 240 of the taxi.

Next, center apparatus 200 searches for a necessary route, and on the basis of the number of people the user accompanies, selects a limousine bus from station 550 to theme park 750. Then center apparatus 200 searches for the reservation database (not shown) of limousine bus 630, registers the reservation to the database, and generates guide data which radio apparatus needs.

Center apparatus 200 transmits the guide data, generated in center apparatus 200 on the basis of the conditional data, to guide apparatus 612 mounted in limousine bus 630 via communication network 285 and base station 640 of the limousine bus. Center apparatus 200 also transmits guide data including the following items to guide apparatus 212 mounted in taxi 230 via communication network 285 and base station 240 of the taxi:

(bb) company name of the limousine-bus;

(cc) route name;

(dd) name of the bus stop, i.e. theme park 750;

(ee) content of the reservation, i.e. reservation ID;

(ff) fare;

(gg) departure time from station 550; and (hh) expected arrival time at theme park 750.

Guide apparatus 212 transmits the guide data received from center apparatus 200 and updated guide data generated by itself to radio apparatus 15 by a short range communication as appropriate. Radio apparatus 15 receives the foregoing guide data and displays it or outputs it by sound to the user.

Taxi 230 carrying the user arrives at station 350, and the user gets off taxi 230 at the taxi stand. The user has transmitted conditional data to call guide apparatus 312 intermittently by a short range communication, and porter 330 reserved has come around the taxi stand, so that the user can see porter 330. Porter 330 then loads the luggage on the cart and transports it to an optimum place on the boarding platform at which train 430 the user takes is arriving.

When the user takes train 430, radio apparatus 15 operated by the user transmits conditional data including the name of station where the user gets off to guide apparatus 412. When train 430 nearly reaches arrival station 550, guide apparatus 412 transmits guide data notifying the user of preparation for get-off. Radio apparatus 15 receives the guide data, and recognizes that it is in the coach, so that it does not guide through the speaker, but informs the user of the preparation for get-off by displaying text data and by vibration.

Upon arrival at station 550, the user transmits conditional data including the data about the limousine bus to get on, through a short range communication, to guide apparatus 512 prepared at a guide desk in the station. Guide apparatus 512 receives the conditional data, and provides a route accessing a bus stop where limousine-bus 630 departs, and data about the station or its vicinity such as a necessary time to pass through the wicket. This data is collected from data of a magnitude of crush at the wickets detected by detectors 551, 552, i.e. means for obtaining vicinity information.

The user passes through the wicket, which leads the user to the bus stop in the shortest time. When the user gets on limousine bus 630 at the bus stop, the user transmits conditional data including the reservation ID to guide apparatus 612, which then admits the user to get on the bus upon agreeing the reservation ID received with the ID previously given.

When limousine bus 630 carrying the user nearly reaches theme park 750, guide apparatus 612 transmits guide data including an arrival notice to radio apparatus 15. The user gets off the bus upon arrival.

In theme park 750, radio apparatus 15 requests guide apparatus 712 prepared at guide desk 720 to transmit information about an output format, and receives the information from guide apparatus 712.

Then the user selects event hall 730, i.e. the destination, using radio apparatus 15, and transmits event hall 730 as conditional data. Guide apparatus 712 receives this conditional data, and searches for the route, then generates the guide data and transmits it to radio apparatus 15. Radio apparatus 15 uses the guide data for guiding the user to event hall 730.

The fifth embodiment as discussed above proves that the guide system allows a guide apparatus, which receives conditional data, to transfer the conditional data to other guide apparatuses or the center apparatus, and the center apparatus searches for routes extending over plural guide apparatuses. The guide system also takes a necessary action in response to the result of the search, e.g. making a reservation, and generates guide data including the result of the reservation.

The center apparatus transmits the guide data generated to another guide apparatus as conditional data, and the another guide apparatus generates and transmits guide data corresponding to the conditional data received. The center apparatus receives the guide data, and transmits it to the guide apparatus which has firstly received the conditional data.

The guide apparatus transmits the guide data generated by itself and other guide data generated by other guide apparatuses or the center apparatus to the radio apparatus. Since the guide system carries out the foregoing operation, if the guide apparatus encounters conditional data received from the radio apparatus exceeds the coverage of the guide apparatus, the guide apparatus transfers the conditional data to another guide apparatus or the center apparatus. Then the another guide apparatus or the center apparatus generates a second guide data, and transmits it together with the guide data generated by the guide apparatus to the radio apparatus. Thus the radio apparatus can advantageously provide a useful guide to the user free from the limits to the coverage covered by a short range communication between the guide apparatus and the radio apparatus.

In the embodiment discussed above, taking a taxi near the user's house, using a porter, taking a train and a limousine bus, guiding the user to a theme park, and searching for a route in the center apparatus are taken for example; however, the present invention is not limited to this instance. The present invention is applicable to other transportation means, and other sites. The present invention is also applicable to a case where another guide apparatus generates guide data corresponding to conditional data independently of the center apparatus.

INDUSTRIAL APPLICABILITY

The present invention is useful to a guide system in which a guide apparatus generates guide data on the basis of conditional data transmitted from a radio apparatus, then transmits the guide data to the radio apparatus to use.

The guide system of the present invention needs no data-carrier reader. The system transmits a variety of conditional data from the radio apparatus to the guide apparatus, which then generates guide data corresponding to the variety of conditional data and transmits the guide data to the radio apparatus. The radio apparatus receives the guide data for the user to use.

The invention claimed is:

1. A guide system comprising:

a guide apparatus; and a radio apparatus for communicating with the guide apparatus, wherein the guide apparatus includes:

guide data generating means for generating guide data on the basis of conditional data transmitted from the radio apparatus;

a communication means for one of transmitting the guide data to the radio apparatus and receiving the conditional data from the radio apparatus, wherein the radio apparatus includes:

a communication means for one of receiving the guide data generated by the guide apparatus and transmitting the conditional data to the guide apparatus, wherein the radio apparatus receives and uses the guide data transmitted from the guide apparatus, a telephone communication means for making and receiving a telephone call; and a wire connecting means for connecting with an external apparatus;

wherein the conditional data included in the radio apparatus is generated from at least one of:

data obtained in advance from the guide apparatus via the communication means;

data obtained via a communication network coupled to a base station, wherein the telephone communicator makes a radio telephone connection to the base station for coupling the communication network to the base station;

data obtained from the external apparatus via the wire connecting means;

data prepared in advance at the telephone communication means; and data stored in advance in a memory means which stores the guide information, wherein the guide apparatus includes a position calculating means which is mounted or carried in a mobile unit for detecting a present position of the mobile unit, and when the guide apparatus receives a destination as conditional data from the radio apparatus, the guide apparatus generates the guide data about how to reach the destination and transmits the guide data to the radio apparatus, wherein the guide apparatus includes a transmitting means for transmitting a cost, as the guide data, for a guide served by the guide apparatus to an owner of the radio apparatus, wherein the radio apparatus includes a transmitting means for transmitting the cost to a message accounting center which charges the cost to the owner.

2. The guide system of claim 1, wherein the radio apparatus includes a memory means for storing a past use record, and at a new use, the radio apparatus reads the past use record for transmitting the record as conditional data to the guide apparatus, wherein the guide apparatus includes a calculating means for discounting a cost depending on the conditional data received, and transmits the discounted cost as guide data to the radio apparatus.

3. The guide system of claim 1, wherein the radio apparatus includes:

an obtaining means for obtaining information of an output format as the guide data one of via the communication network and from the guide apparatus; and an output means for outputting the guide data received from the guide apparatus following the information of the output format.

4. The guide system of claim 1, wherein the guide apparatus includes an obtaining means for obtaining vicinity information, and the guide data generating means generates the guide data including the vicinity information obtained.

5. The guide system of claim 1, wherein the guide apparatus includes a transmitting means for transmitting guide data to the radio apparatus at least one of when the guide apparatus arrives at the destination and when the guide apparatus nearly reaches the destination, the guide data including data of at least one of the arrival and the nearly reaching to the destination, wherein the radio apparatus includes a notifying means for notifying a user, with at least one of sound and vibration, of at least one of the arrival and the nearly reaching to the destination after receiving the guide data.

6. The guide system of claim 1, wherein when the guide apparatus receives the conditional data including at least two destinations, the guide apparatus transmits the guide data of visiting the destinations in a predetermined order.

7. The guide system of claim 6, wherein the order makes a total length of routes for visiting the destinations shortest.

8. The guide system of claim 1, wherein the guide apparatus includes an output means for transforming at least one of the conditional data and the guide data, which are transmitted from the radio apparatus, in response to an output format for outputting.

9. The guide system of claim 1, wherein the radio apparatus includes:

an obtaining means for obtaining information as the guide data about an output format of the guide data from the guide apparatus; and an output means for outputting the guide data received from the guide apparatus following the information about the output format.

10. The guide system of claim 1, wherein the guide apparatus includes an obtaining means for obtaining vicinity information and the guide data generating means generates the guide data including the vicinity information obtained.

11. A guide system comprising:

a guide apparatus; and a radio apparatus for communicating with the guide apparatus, wherein the guide apparatus includes:

guide data generating means for generating guide data on the basis of conditional data transmitted from the radio apparatus;

a communication means for one of transmitting the guide data to the radio apparatus and receiving the conditional data from the radio apparatus, wherein the radio apparatus includes:

a communication means for one of receiving the guide data generated by the guide apparatus and transmitting the conditional data to the guide apparatus, wherein the radio apparatus receives and uses the guide data transmitted from the guide apparatus, a telephone communication means for making and receiving a telephone call; and a wire connecting means for connecting with an external apparatus;

wherein the conditional data included in the radio apparatus is generated from at least one of:

data obtained in advance from the guide apparatus via the communication means;

data obtained via a communication network coupled to a base station, wherein the telephone communicator makes a radio telephone connection to the base station for coupling the communication network to the base station;

data obtained from the external apparatus via the wire connecting means;

data prepared in advance at the telephone communication means; and data stored in advance in a memory means which stores the guide information, wherein the guide apparatus includes:

a second communication means for communicating with a center apparatus which communicates, via one of a wire and radio, and one of directly and via a communication network, with another guide apparatus, or both of the guide apparatus and the another guide apparatus, and when the guide apparatus generates guide data corresponding to the conditional data received from the radio apparatus, the guide apparatus transmits at least a part of the conditional data to the another guide apparatus or the center apparatus, then the another guide apparatus or the center apparatus generates a second guide data on the basis of the conditional data received, and transmits the second guide data back to the guide apparatus, and the guide apparatus transmits the guide data generated by itself together with the second guide data to the radio apparatus.

* * * * *

UNITED STATES PATENT AND TRADEMARK OFFICE

CERTIFICATE OF CORRECTION

PATENT NO. : 7,315,780 B2
APPLICATION NO. : 10/489900
DATED : January 1, 2008
INVENTOR(S) : Sugahara et al.

It is certified that error appears in the above-identified patent and that said Letters Patent is hereby corrected as shown below:

At Column 16, line 19, insert --wherein the radio apparatus includes:--.

At Column 18, line 10, insert --wherein the radio apparatus includes:--.

Signed and Sealed this

Third Day of June, 2008

JON W. DUDAS
*Director of the United States Patent and Trademark Office*